US012695019B2

(12) United States Patent
Mbuy et al.

(10) Patent No.: US 12,695,019 B2
(45) Date of Patent: Jul. 28, 2026

(54) ELECTRIC DEVICE WITH FORCED DIRECT COOLING

(71) Applicant: Siemens Energy Global GmbH & Co. KG, Munich (DE)

(72) Inventors: Aime Mbuy, Nürnberg-Weiherhaus (DE); David Weber, Weilersbach (DE); Viktor Wins, Wilhermsdorf (DE); Christer Vogt, Langensendelbach (DE); Katharina Schäfer, Stein (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 773 days.

(21) Appl. No.: 18/006,422

(22) PCT Filed: Jul. 23, 2020

(86) PCT No.: PCT/EP2020/070850
§ 371 (c)(1),
(2) Date: Jan. 23, 2023

(87) PCT Pub. No.: WO2022/017609
PCT Pub. Date: Jan. 27, 2022

(65) Prior Publication Data
US 2023/0268115 A1 Aug. 24, 2023

(51) Int. Cl.
*H01F 27/20* (2006.01)
*H01F 27/02* (2006.01)
(Continued)

(52) U.S. Cl.
CPC ........... *H01F 27/20* (2013.01); *H01F 27/025* (2013.01); *H01F 27/24* (2013.01); *H01F 27/2876* (2013.01); *H01F 27/32* (2013.01)

(58) Field of Classification Search
CPC ........ H01F 27/20; H01F 27/025; H01F 27/24; H01F 27/2876; H01F 27/32; H01F 27/322; H01F 27/10
(Continued)

(56) References Cited

U.S. PATENT DOCUMENTS 2,440,556 A * 4/1948 Paluev .................... H01F 27/12 165/104.31
3,059,043 A * 10/1962 Bianco .................... H01F 27/12 174/31 R
3,137,829 A 6/1964 Dillow et al.
3,371,299 A * 2/1968 Radkowski ............. H01F 27/12 336/60
(Continued)

FOREIGN PATENT DOCUMENTS

CN 103688322 A 3/2014
CN 206480467 U 9/2017
(Continued)

OTHER PUBLICATIONS

Yang, Gas turbines and their applications, 1955, p. 248-251, Machinery Industry Press, Beijing, China.

*Primary Examiner* — Tuyen T Nguyen
(74) *Attorney, Agent, or Firm* — Laurence A. Greenberg; Werner H. Stemer; Ralph E. Locher

(57) ABSTRACT
An electric device for connection to a high voltage includes an active part having a magnetizable core and at least one winding arrangement, each surrounding a core section of the core and having windings inductively coupled together, forming cooling channels in the windings. A boiler is filled with insulating fluid and the active part is completely disposed therein. The boiler has at least one insulating fluid inlet and at least one insulating fluid outlet interconnected by a circulation system outside of the boiler having a cooling unit and a pump for circulating the insulating fluid. The electric device has improved cooling achieved by each insulating fluid inlet being connected to a distributing unit, which is disposed on one of the end sides of the winding
(Continued)

assembly, via an insulating fluid line extending in the boiler, the distributing unit distributing cooled insulating fluid to the cooling channels.

11 Claims, 7 Drawing Sheets

(51) Int. Cl.

| | |
|---|---|
| ***H01F 27/24*** | (2006.01) |
| ***H01F 27/28*** | (2006.01) |
| ***H01F 27/32*** | (2006.01) |

(58) Field of Classification Search
USPC .................................................... 336/55–62
See application file for complete search history.

(56) References Cited

U.S. PATENT DOCUMENTS

| | | | | |
|---|---|---|---|---|
| 3,663,910 | A * | 5/1972 | Grubb .................... | H01F 27/12 336/60 |
| 10,629,352 | B2 | 4/2020 | Stefanutti et al. | |
| 2011/0309902 | A1 | 12/2011 | Bonin et al. | |
| 2013/0307654 | A1 | 11/2013 | Hyde et al. | |
| 2014/0132381 | A1 | 5/2014 | Weber et al. | |

FOREIGN PATENT DOCUMENTS

| | | | |
|---|---|---|---|
| CN | 209785692 | U | 12/2019 |
| GB | 561384 | A | 5/1944 |
| JP | S5296313 | A | 8/1977 |
| WO | WO 2016038222 | A1 | 3/2016 |
| WO | WO 2018184775 | A1 | 10/2018 |

* cited by examiner

ELECTRIC DEVICE WITH FORCED DIRECT COOLING

FIELD AND BACKGROUND OF THE INVENTION

The invention relates to an electric device for connection to a high voltage with an active part which has a magnetizable core and at least one winding arrangement which in each case surrounds a core section of the core and has windings coupled inductively to one another, wherein cooling channels are formed in the windings, a boiler which is filled with an insulating fluid and in which the active part is completely arranged, wherein the boiler has at least one insulating liquid inlet and at least one insulating liquid outlet which are connected to each other via a circulation system which is arranged outside the boiler and has a cooling unit and a pump for circulating the insulating fluid.

Such an electric device is already known from WO 2018/184775 A1. A traction transformer is disclosed here which has an active part and a boiler in which the active part is completely arranged. The active part comprises a core with two core limbs which are each surrounded by two windings arranged concentrically with respect to each other. The boiler has a central part which encloses the outer contour of the windings with a complementary shape. The insulating fluid arranged in the boiler for insulation and cooling is circulated via a cooling system.

WO 2016/038222A1 discloses a traction transformer with an active part and a boiler, wherein the core of the active part is arranged completely outside the boiler. The traction transformer is here fastened to the rail vehicle via the core such that no high forces are imparted to the boiler. The boiler can therefore be manufactured from a light material such as, for example, plastic.

Traction transformers are provided for mounting on a rail vehicle such as, for example, a locomotive or a railcar. They serve to supply a desired traction voltage for driving the locomotive or the railcar depending on different input voltages. Previously known traction transformers have a metal boiler which is at a ground potential and is filled with an insulating fluid, for example an ester liquid. The so-called active part of the transformer, which comprises a core consisting of magnetizable flat metal sheets, and at least two windings concentrically surrounding a section of the core, is arranged in the boiler. The boiler is equipped with bushings for connection of the transformer to a high voltage. The insulating fluid is generally circulated via a cooling system arranged outside the boiler.

The previously known electric device has the disadvantage that, because the boiler has a structure with complementary shapes, the windings can no longer be adequately cooled such that during operation the insulating fluid can be heated quickly and the electric device can be operated only at low power.

SUMMARY OF THE INVENTION

The object of the invention is therefore to provide an electric device of the type mentioned at the beginning in which the cooling of the windings is improved.

The invention achieves this object by the insulating liquid inlet being connected, via an insulating fluid line extending in the boiler, to a distribution unit which is arranged at one of the end sides of the winding arrangement and distributes the cooled insulating fluid to the cooling channels.

According to the invention, cooled insulating fluid is no longer introduced just into the boiler. Instead, the cooled insulating fluid is routed, within the scope of the invention, in a targeted fashion directly to the cooling channels of the windings. The insulating fluid line serves, on the one hand, to directly introduce the cooled insulating fluid into the cooling channels of the windings. It extends between the insulating fluid inlet and the distribution unit. The cooled insulating fluid is introduced into the boiler of the electric device at the insulating fluid inlet. By virtue of the insulating fluid line, mixing with the warmer insulating fluid in the boiler no longer occurs immediately after the insulating fluid inlet, as is the case in the prior art. Instead, all of the cooled insulating fluid is routed directly to the distribution unit. The distribution unit finally ensures that the cooled insulating fluid is distributed uniformly to the cooling channels in the windings. In this way, cooled insulating fluid is introduced directly into the cooling channels of the windings, as a result of which the cooling of the windings is improved. By virtue of the improved cooling, the electric device according to the invention can be operated at higher electrical power, for example with higher currents.

The insulating fluid line is advantageously a pipe. A pipe is simple to produce and is therefore commercially available at an affordable price in all variations.

In a preferred variant of the invention, the distribution unit has an intake unit, the front side of which faces the insulating fluid inlet and which has a through opening which is configured to receive the outlet orifice of the insulating fluid line, wherein the rear side of the intake unit is provided with at least one inner groove. According to this embodiment of the invention, the insulating fluid line opens out in a through opening of the intake unit. The cooled insulating fluid thus flows from the insulating fluid inlet to the through opening and passes from there into the or each inner groove on the rear side of the intake unit. The inner groove or the inner grooves serves to radially distribute the insulating fluid.

In a preferred embodiment, the grooves have an annular design and are connected to the through opening. According to the invention, the distribution unit is arranged on the end side, facing the insulating fluid inlet, of a winding arrangement. By virtue of the annular configuration, the distribution of the insulating fluid is adapted to the circular cylindrical configuration of the windings because the cooling channels extend through the windings, evenly distributed, in an axial direction parallel to one another.

The distribution unit advantageously has a perforated plate which bears against the rear side of the intake unit, has through bores, and is fitted with spacers on its side facing away from the intake unit. The spacers are oriented in a radiating fashion and point toward a common center point. They here have a constant spacing from one another and are distributed over the whole circumference of the perforated plate. In other words, the spacers delimit gaps which are like pieces of cake.

According to a further development of the latter, the perforated plate, the spacers, and an outer sealing ring delimit distribution cavities which are each connected to at least one cooling channel. The insulating fluid is radially distributed through the grooves of the intake unit and passes through the through bores into one of the distribution cavities which, as already explained above, has a configuration similar to a piece of cake. Each of these distribution cavities is delimited in an axial direction by the end side of the respective winding arrangement and the perforated plate. The spacers radially delimit each distribution cavity which is therefore closed circumferentially at the outside and inside by an annular sealing ring. The spacers each thus extend radially in a radiating fashion on the rear side of the perforated plate. The insulating fluid passes from the distribution cavities supplied uniformly with cooled insulating fluid into the cooling channels of the windings.

The intake unit and the perforated plate are advantageously configured as disks. The disk-shaped configuration enables a compact structure of the electric device.

The distribution unit preferably has a circular outer contour in a plan view. In this way, the distribution unit is adapted to the form of the winding arrangement, on the front side of which the distribution unit within the scope of the invention is arranged.

Within the scope of the invention, windings of a winding arrangement are preferably arranged concentrically with one another. An outer winding of the winding arrangement is designed, for example, as a primary winding for higher voltages than a secondary winding arranged further inside, or vice versa. In addition to a primary and secondary winding, each winding arrangement can also have further windings such as, for example, an auxiliary winding, a stepped winding, or the like.

The distribution unit is preferably produced from an electrically non-conductive material. In this way, the electromagnetic properties of the electric device according to the invention are not influenced, or in any case only slightly influenced, by the distribution unit.

The boiler preferably has two metal end covers between which extends a central part made from an electrically non-conductive material. The central part is configured, for example, with a complementary shape with the outer contour of the windings and is produced from a light material.

A light material within the sense of the present invention is any material with a dead weight which is lower than steel by a factor of 2. Thus, steel has a density of 7.85-7.87 $g/cm^3$. Materials with a density of less than 3.9 $g/cm^3$ are light materials within the sense of the invention. Examples of such light materials are aluminum, plastics, and fiber-reinforced plastics. The central part preferably consists essentially of a fiberglass-reinforced plastic with a density of 2.5 $g/cm^3$.

In a preferred variant of the invention, the core has two core limbs which extend parallel to each other and are each surrounded by a winding arrangement, wherein the core limbs are connected to each other by a lower and upper yoke. In this way, a closed iron circuit is formed. In this variant of the invention, two winding arrangements are thus provided with, for example, a total of four windings, wherein in each case two windings are arranged concentrically with each other and surround a common limb of the core as a core section. They are here, for example, an inner undervoltage winding and an overvoltage winding surrounding the undervoltage winding. The core moreover has a further limb which is also surrounded by an undervoltage and overvoltage winding. The two undervoltage and overvoltage windings are here, for example, connected in series. The core limbs which extend in each case through one of the two winding arrangements are therefore oriented parallel to each other. The inner wall of the central part of the boiler follows the whole of the outer contour of the outer windings of the respective winding arrangement.

Of course, three or more limbs can also be provided within the scope of the invention, wherein each limb is equipped with a winding arrangement which consists of two or more windings.

The end covers are advantageously also adapted to the sections of the active part which are arranged in their internal volume. According to this further development of the invention, the boiler also does not hug just the outer contour of the outer windings outside its central part, at least in its internal configuration. Instead, the boiler is configured with a complementary shape to the further sections of the active part which likewise determine the outer contour of the active part.

The upper and lower yoke define, together with the respective pressing frame, that outer contour of the active part which is not defined by the windings. However, whereas the windings define a generally cylindrical outer contour, the remaining outer contour of the active part deviates considerably therefrom. The adaptation of the boiler so that its shape complements this rather more complex outer contour is therefore limited to forming a box-like envelope. This means that the configuration of the boiler does not reproduce every screw or every bolt and instead reproduces the whole section with a box-like and partially rounded contour. This box-like contour then delimits an internal space which enables said active part sections to be accommodated with overload protection but at the same time the internal volume of the boiler is limited to a minimum.

The end covers are advantageously manufactured from a metal or a metal alloy. It is particularly preferred that the end covers are manufactured from steel. Steel has a high mechanical strength.

The end covers expediently each have a box-like configuration. A box-like configuration can be produced as standard. Adaptation to the respective individually manufactured active part is omitted in this variant of the invention. In this way, further costs can be saved.

At least one end cover advantageously has a viewing window and/or a hand opening. According to this further development of the invention, the electric device can be produced and maintained simply.

The electric device is preferably a traction transformer.

A magnetizable material is here understood to be a ferromagnetic material such as, for example, iron. Within the scope of the invention, the core preferably forms a closed iron circuit.

Further expedient configurations and advantages of the invention are the subject of the following description of exemplary embodiments of the invention with reference to the Figures in the drawings, wherein the same reference signs refer to components that act in the same way, and wherein.

DETAILED DESCRIPTION OF THE INVENTION

Figure 1:
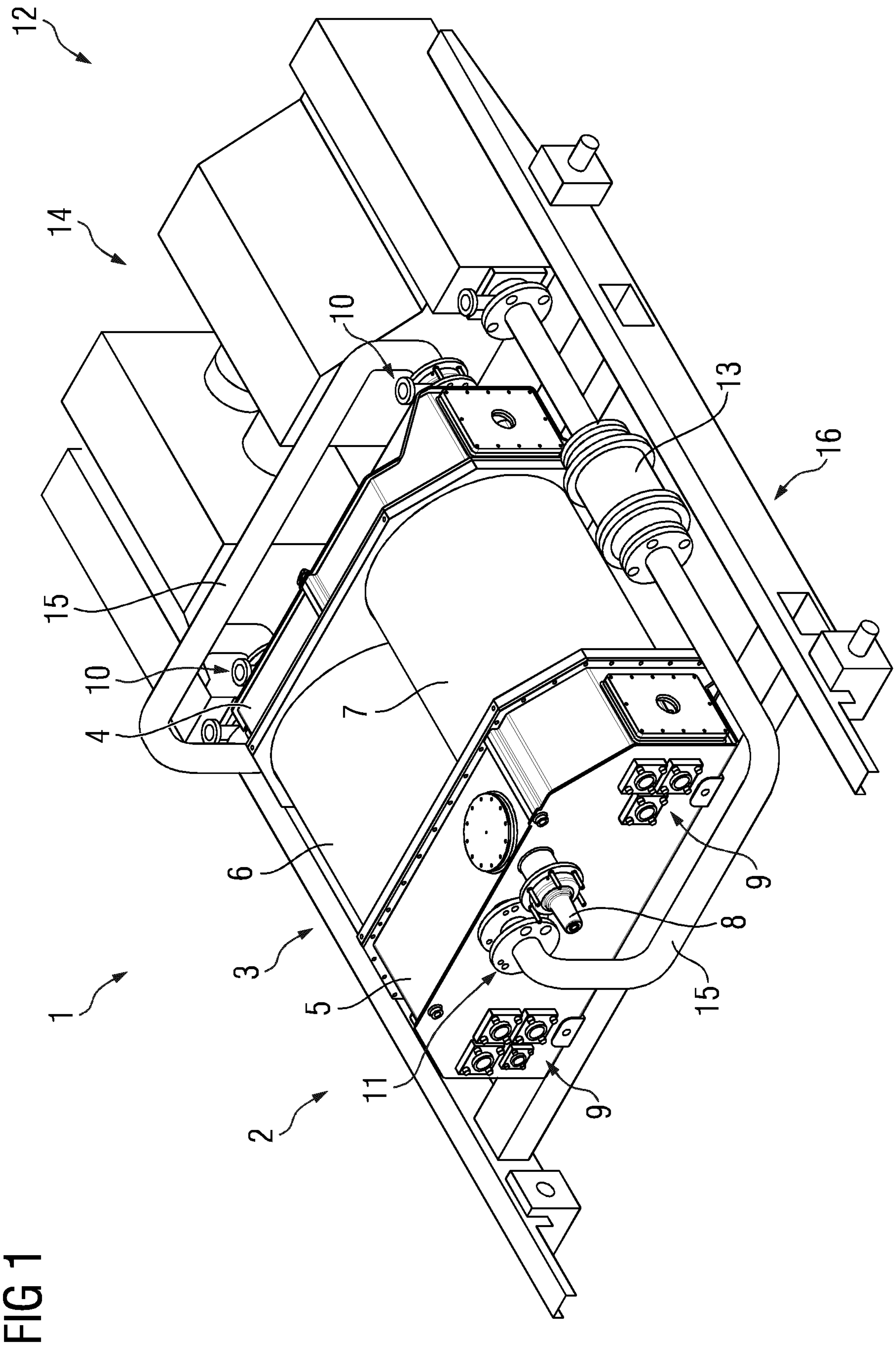
FIG. 1 illustrates an exemplary embodiment of the electric device according to the invention in a perspective illustration.
Figure 9:
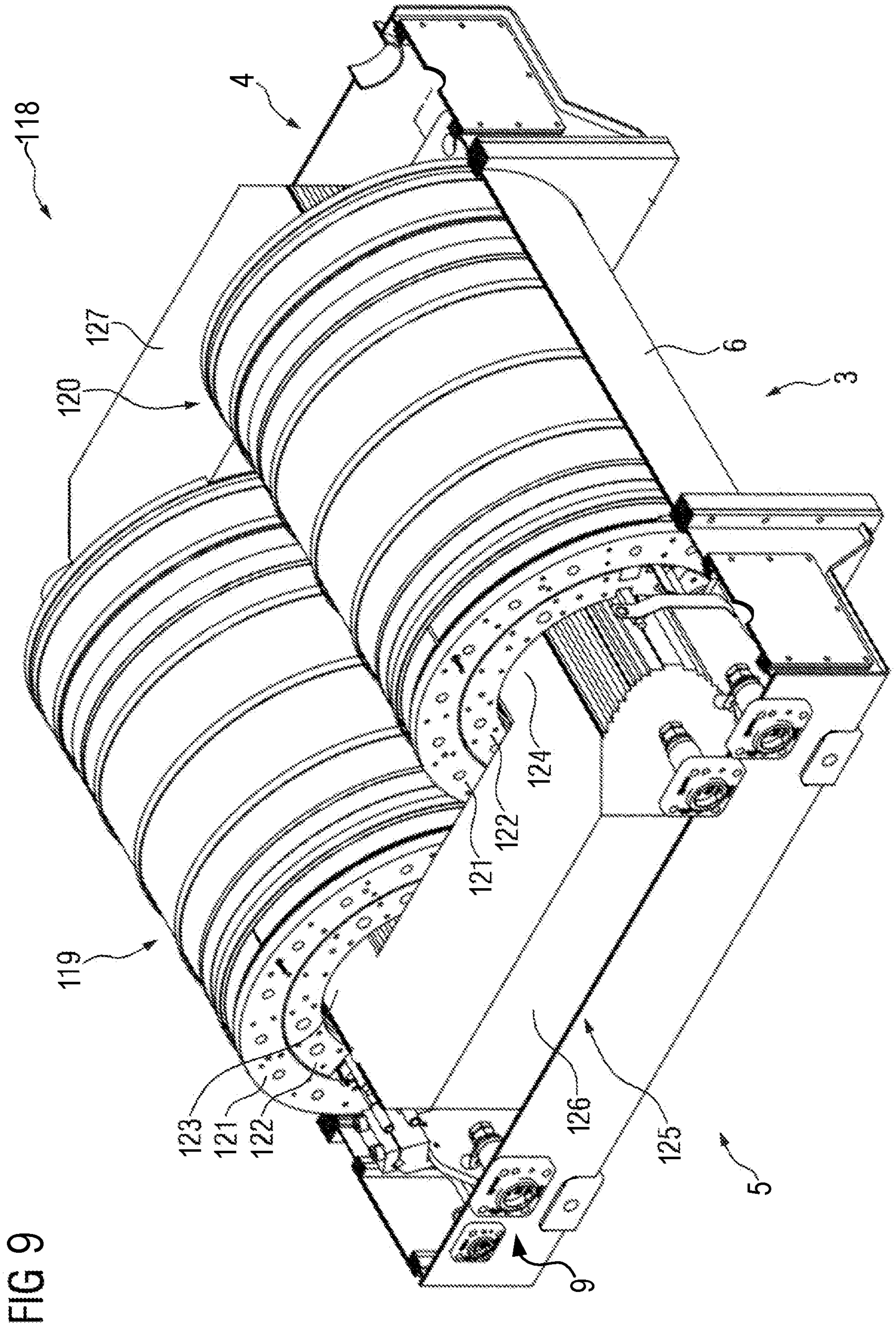
FIG. 9 shows a portion of the traction transformer of FIG. 1 having parts of the housing omitted in order to obtain a clear view of the active part according to one embodiment of the invention.

FIG. 1 shows an exemplary embodiment of the electric device 1 in a perspective illustration; the electric device illustrated there is configured as a traction transformer 1. The traction transformer 1 has a boiler 2 which consists of a central part 3 and two end covers 4 and 5. The end covers 4 and 5 are made from steel, whereas the central part 3 is manufactured from a fiberglass-reinforced plastic. An active part 118 of FIG. 9 is arranged in the boiler 2, wherein the boiler is filled with an insulating fluid. Referring now to FIG. 9, the active part 118 comprises a magnetizable iron core 125 which has two core limbs 123 and 124 which are connected to each other via an upper and lower yoke 126 and 127. Each core limb 123, 124 is surrounded by a winding arrangement 119, 120, wherein each winding arrangement consists of an inner undervoltage winding 122 and an outer overvoltage winding 121. The winding arrangement moreover comprises an auxiliary winding. The upper, lower, and auxiliary windings are arranged as an axial extension of the undervoltage winding 122 concentrically with one another and relative to the core limb which passes through the inside of these windings.

The central part 3 forms two housing tubes 6 and 7 which each surround one of the winding arrangements. The lower and upper yoke are arranged in the upper 4 and lower end cover 5. An input bushing 8 serves to connect the overvoltage windings, connected to each other in parallel, to the high-voltage overhead wire. The undervoltage winding is connected on the output side to cable-connection sockets 9. The desired traction voltage can be taken off by introducing suitable cable plugs into the respective cable-connection socket 9.

The end cover 4 has two insulating fluid inlets 10, whereas the end cover 5 is equipped with an insulating fluid outlet 11. Lastly, a circulation system 12 can be seen which, in addition to a pump 13, comprises a cooling unit 14 which is equipped with a heat exchanger for cooling the circulated insulating fluid. The circulation system 12 moreover has a pipe 15. Heated insulating fluid is drawn out of the insulating fluid outlet 11 with the aid of the circulation system 12 and fed to the heat exchanger of the cooling unit 14 via the tubing 15. From there, the cooled insulating fluid passes to the insulating fluid inlets 10 in order to be introduced there back into the boiler 2.

The traction transformer 1 moreover has a support frame 16, for mounting on a rail vehicle, but there is no need to go into further detail about this at this point.

Figure 2:
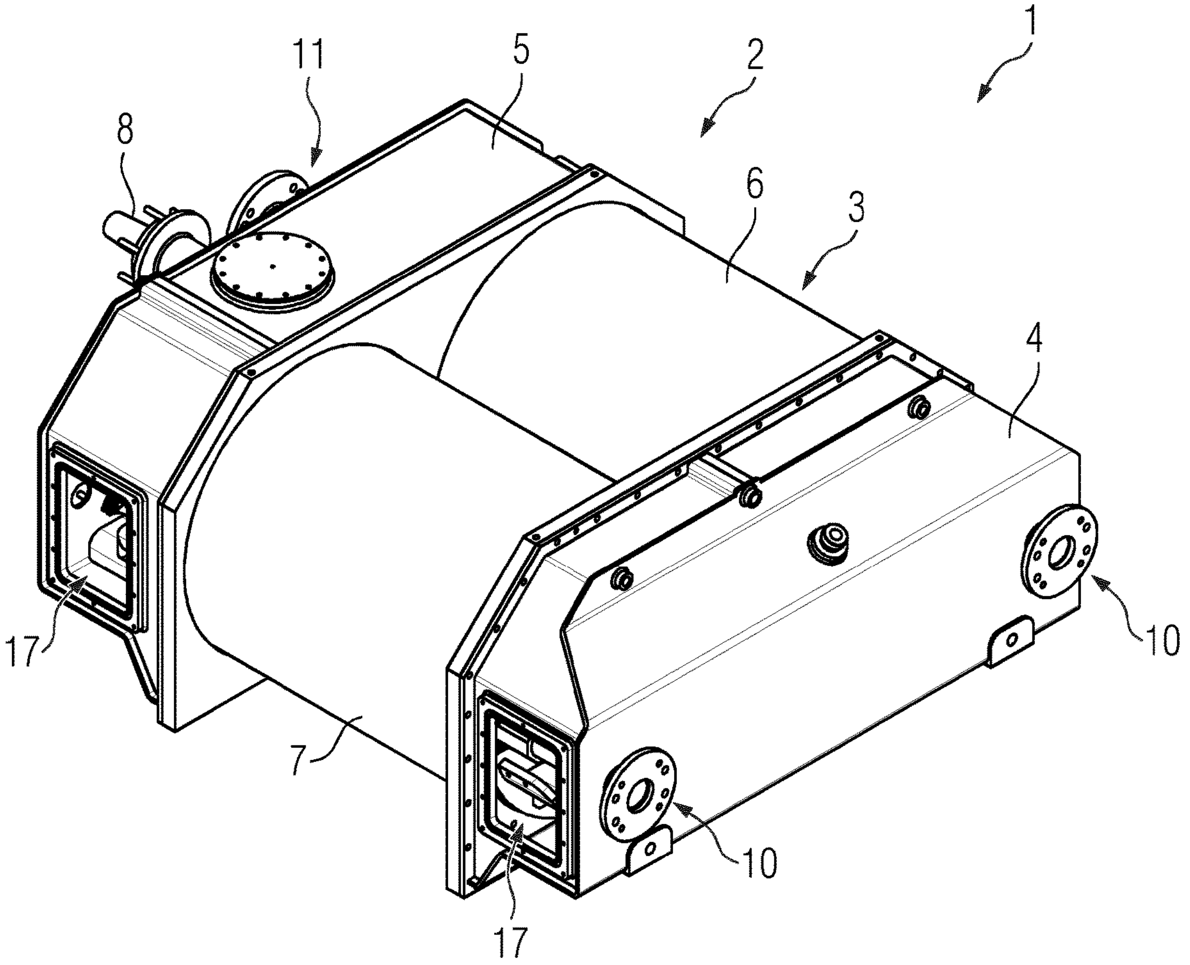
FIG. 2 illustrates the electric device according to FIG. 1 with no circulation system and support frame.

FIG. 2 shows the boiler 2 of the electric device according to FIG. 1 in a perspective illustration, wherein the circulation system and the support frame have been omitted for the sake of greater clarity. The end cover 4 with the insulating fluid inlet 10 can be seen in the foreground, whilst the end cover 5 with the insulating fluid outlet 11 is illustrated in the background. It can be seen that the end covers 5 are equipped with hand holes 17 which facilitate the mounting and maintenance of the traction transformer 1.

Because the central part 3 is manufactured from a light material and two tubes 6 and 7 bearing tightly against the winding arrangements, less insulating fluid is required to completely fill the boiler. By virtue of the reduced volume of insulating fluid, the latter achieves critical temperature ranges more quickly during operation and constant cooling. For this reason, within the scope of the invention, the cooling of the windings has been improved.

Figure 3:
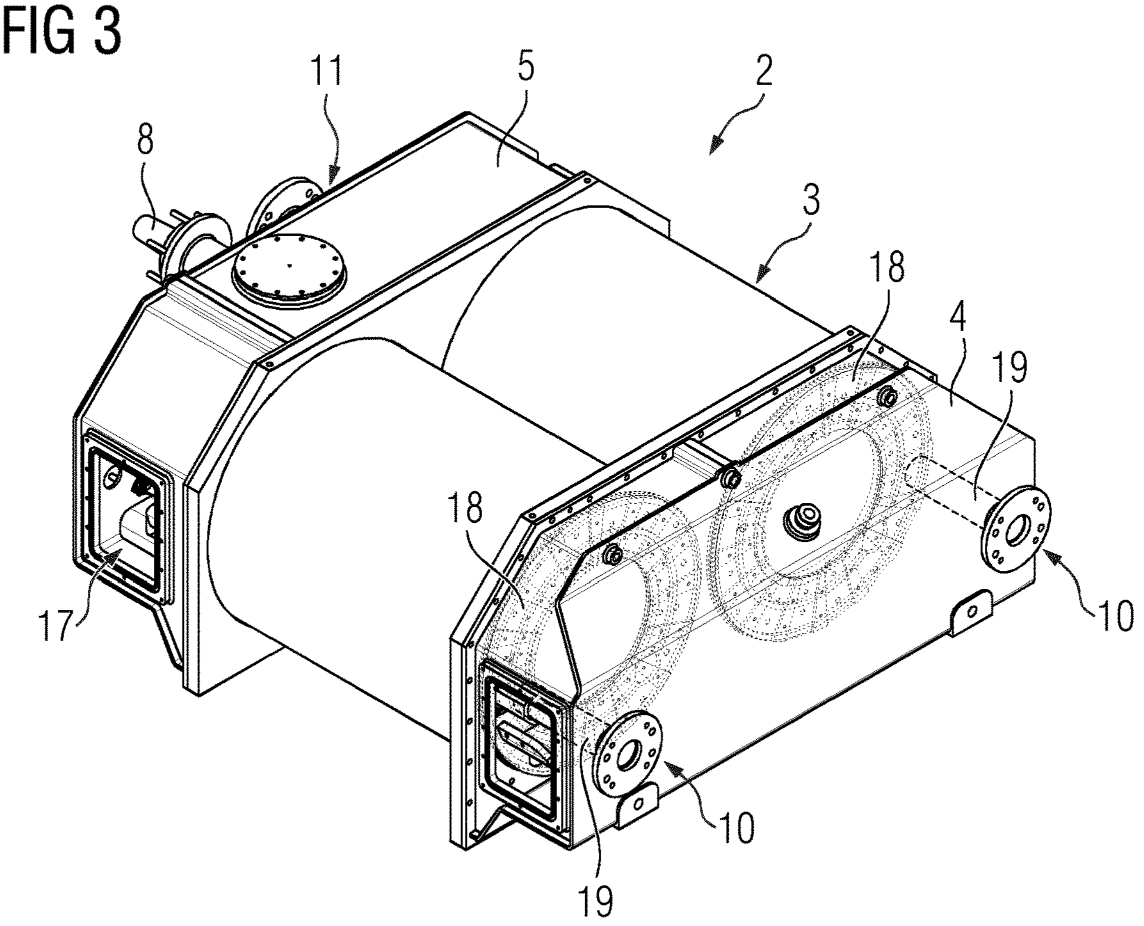
FIG. 3 illustrates the electric device according to FIG. 2 with an insulating fluid line indicated.

FIG. 3 shows the boiler according to FIG. 2, wherein the means for the improved cooling are, however, indicated. Thus, an insulating fluid line 19 extends between each insulating fluid inlet 10 and a distribution unit 18. With the aid of the insulating fluid line 19, which has a tubular configuration, the cooled insulating fluid fed into the insulating fluid inlet 10 is routed directly to the distribution unit 18 such that it no longer mixes with the warm insulating fluid arranged in the inner end cover 4. The distribution unit 18 is here arranged on the end side of the winding arrangement which in each case faces the insulating fluid inlet 10. The distribution unit here has an annular design in plan view such that it covers the whole end side of the winding arrangement.

Figure 4:
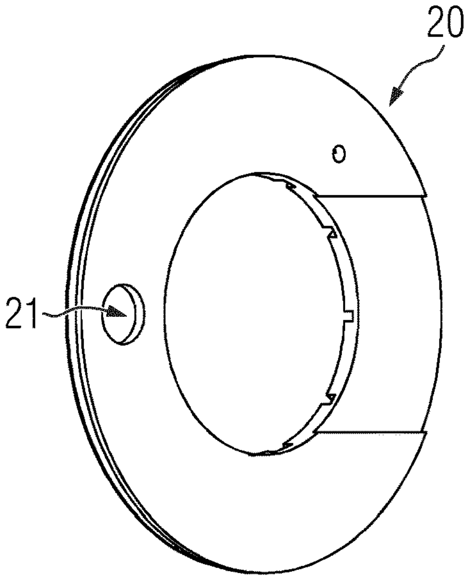
FIGS. 4 and 5 illustrate the front and rear side of an intake unit of a distribution unit in a perspective illustration.
Figure 5:
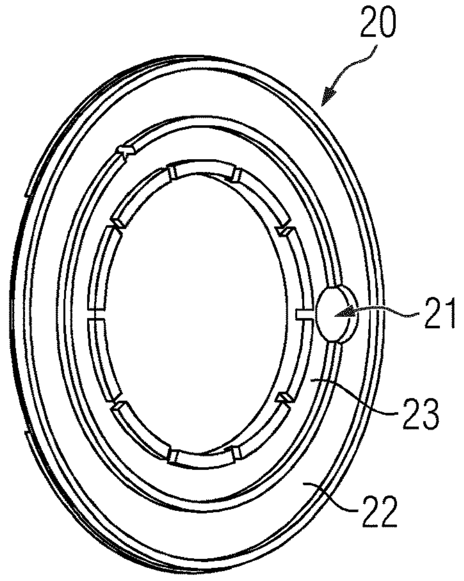

The distribution unit 18 has an intake unit 20 which is shown from the front in FIG. 4 and from the rear in FIG. 5. It can be seen that the front side has a plane design, wherein a through bore 21 can be seen which serves to receive the outlet opening of the connecting line 19. In this way, the inflowing cooled insulating fluid passes through the through bore 21 to the rear side of the intake unit 20 which is equipped with an inner 23 and outer 22 annular groove. Both grooves 22 and 23 open out in the intake opening 21 such that the inflowing insulating fluid is routed through the grooves 22 and 23.

Figure 6:
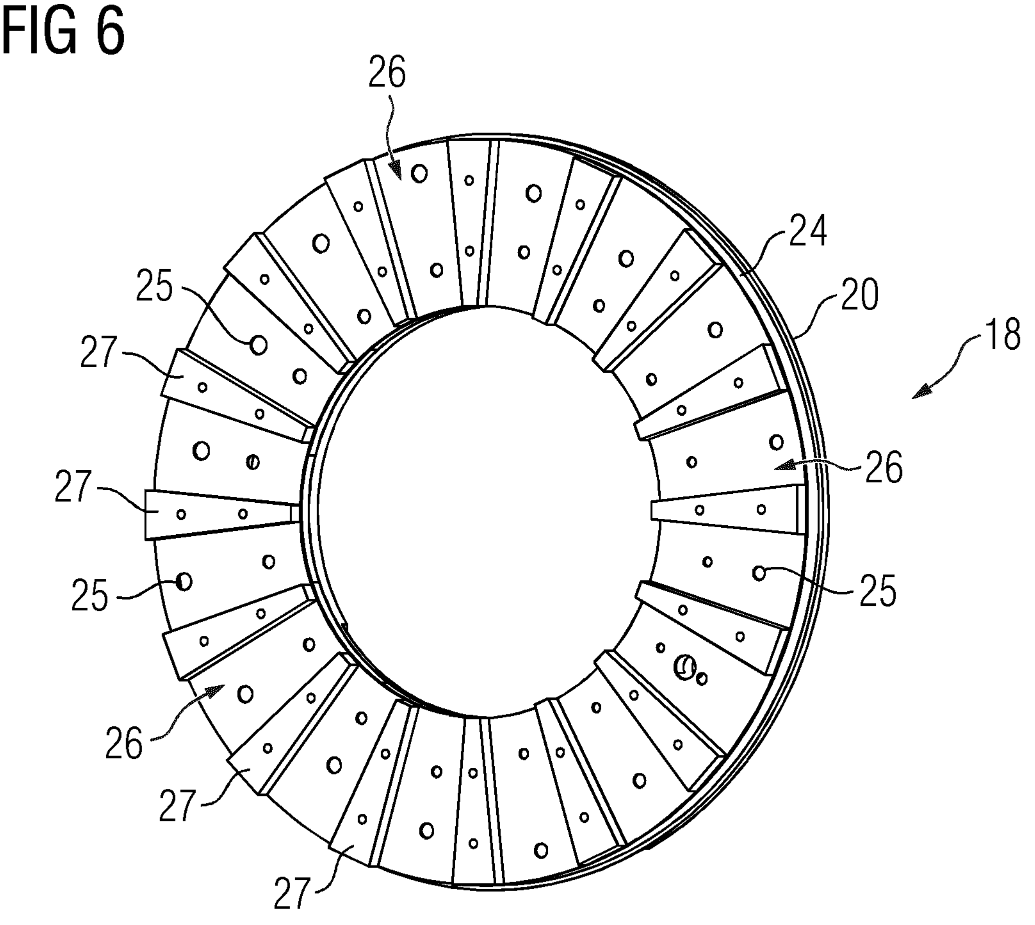
FIG. 6 illustrates the rear side of a perforated plate in a perspective illustration.

The rear side, shown in FIG. 5, of the intake unit 20 bears against the front side of a perforated disk 24 which is shown from the rear in FIG. 6. The perforated disk 24 is equipped with through bores 25 which enable the passage of insulating fluid from the grooves 22, 23 of the intake unit 20 into distribution cavities 26 which are delimited in the axial direction once by the perforated disk 24 and by the end side of the winding arrangement (not shown). The distribution cavities 26 are delimited laterally by spacers 27 which are oriented radially or in a radiating fashion and form distribution cavities 26 which resemble pieces of cake. An outer delimiting ring (not illustrated representationally) and an inner delimiting ring (likewise not illustrated representationally) ensure that the escape of insulating fluid in a radial direction inward or outward from the distribution cavities 26 is avoided.

Figure 7:
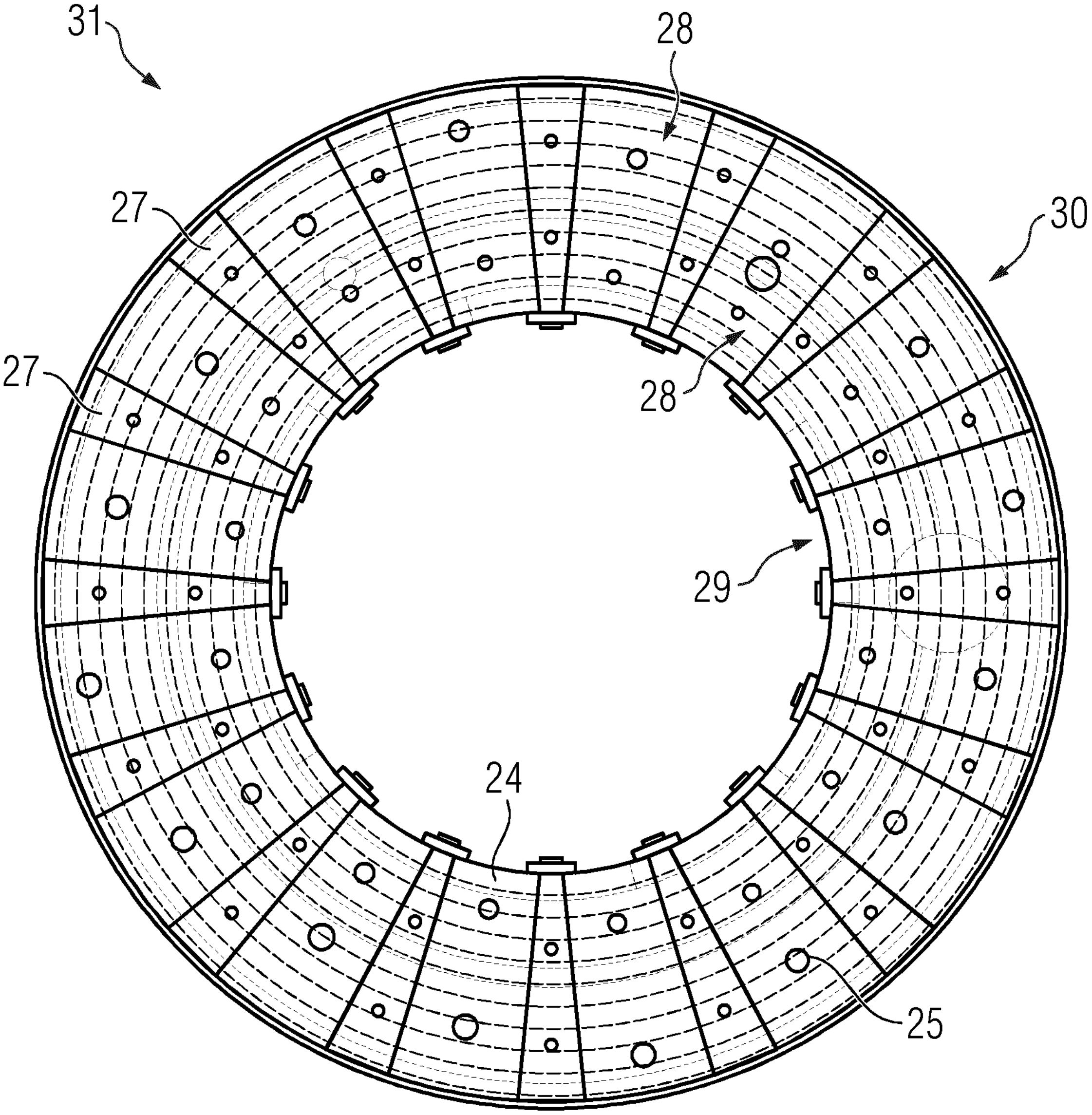
FIG. 7 illustrates the end side of a winding arrangement in a plan view.

FIG. 7 shows the end side of a winding arrangement 31 in a plan view, wherein the end side shown faces away from the distribution unit 18. The winding arrangement 31 has an inner low-voltage winding 29 which is extended in the axial direction by an auxiliary winding, and an outer overvoltage winding 30 arranged concentrically with the undervoltage winding. It can be seen that the layers of the respective winding 29 or 30 are not wound directly on top of one another and instead are spaced apart from one another. This is effected by wrapping round so-called winding strips which are not illustrated in the Figure. The strips ensure the radial spacing of the winding layers which is required there such that cooling channels 28 are formed between the winding layers and the strips. By virtue of the cooling channels 28, the rear side, arranged at the other end side of the winding arrangement 31, of the perforated disk 24 including its spacers 27 and its through bore 25 can be seen. It can thus be understood that cooled insulating fluid entering the distribution cavities 26 flows through the cooling channels 28 of the windings and thus ensures improved cooling of the windings 29 and 30.

Figure 8:
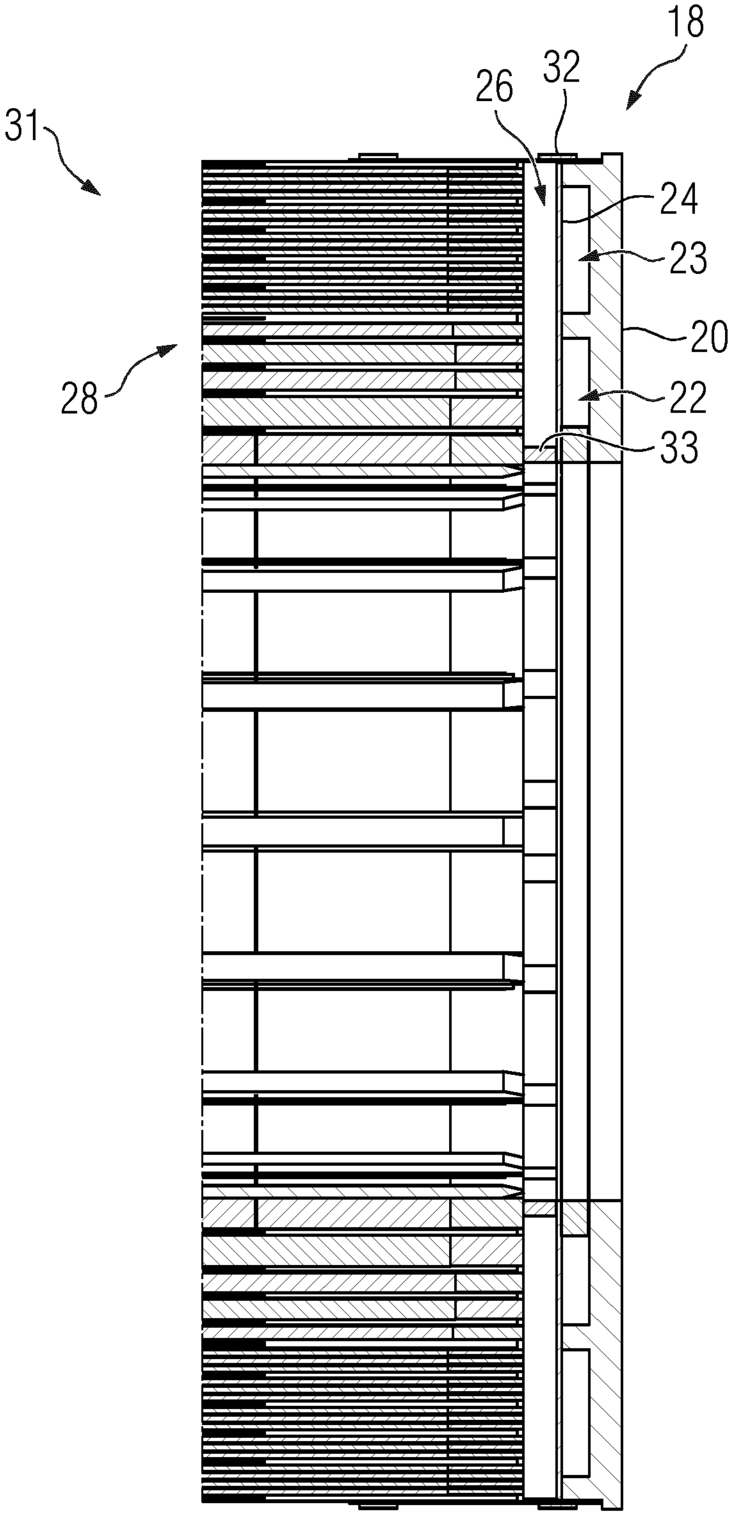
FIG. 8 illustrates an exemplary embodiment of a distribution unit in a side view.

FIG. 8 shows that end of the winding arrangement 31 which faces the distribution unit 18, and the distribution unit 18 itself. The distribution unit 18 is here illustrated in a partially cutaway view. First, the intake unit 20 can be seen which has on its rear side an inner groove 23 and an outer groove 22 which, as has already been explained, are both connected to the intake opening which is not illustrated in FIG. 8. Furthermore, the perforated disk 24 can be seen which delimits the grooves 22 and 23. The perforated disk 24 is equipped with through openings, not illustrated representationally, which enable the passage of the insulating fluid from the grooves 22, 23 into the distribution cavities 26 which are delimited on one side by the perforated disk 24 and on the other side by the end side of the winding arrangement. In order to avoid the escape of insulating fluid from the distribution cavities 26, an outer sealing ring 32 and an inner sealing ring 33 can be seen which ensure that the cooled insulating fluid passes from the distribution cavities 26 into the cooling channels 28 of the windings.

The invention claimed is:

1. An electric device for connection to a high voltage, the electric device comprising:

an active part having a magnetizable core with a core section and at least one winding arrangement surrounding said core section, said at least one winding arrangement having end sides and having windings coupled inductively to one another, said windings having cooling channels formed therein;

a boiler filled with an insulating fluid, said boiler completely enclosing said active part, said boiler having at least one insulating fluid inlet and at least one insulating fluid outlet;

a circulation system interconnecting said at least one insulating fluid inlet and said at least one insulating fluid outlet, said circulation system disposed outside said boiler and including a cooling unit and a pump for circulating the insulating fluid;

a distribution unit disposed at one of said end sides of said winding arrangement for distributing cooled insulating fluid to said cooling channels;

said distribution unit having a perforated plate bearing against a rear side of said intake unit, and said distribution unit is fitted with spacers on a side of said distribution unit facing away from said intake unit; and an insulating fluid line extending in said boiler and connecting said at least one insulating fluid inlet to said distribution unit.

2. The electric device according to claim 1, wherein said insulating fluid line is a piece of tubing.

3. The electric device according to claim 1, wherein said insulating fluid line has an outlet orifice, said distribution unit has an intake unit with a front side facing said at least one insulating fluid inlet, said intake unit has a through opening configured to receive said outlet orifice, and said intake unit has a rear side provided with inner grooves.

4. The electric device according to claim 3, wherein said grooves have an annular shape and are connected to said through opening.

5. The electric device according to claim 3, wherein said distribution unit has through bores.

6. The electric device according to claim 5, which further comprises an outer sealing ring, said perforated plate, said spacers and said outer sealing ring delimiting distribution cavities each connected to at least one of said cooling channels.

7. The electric device according to claim 6, wherein said intake unit and said perforated plate are disks.

8. The electric device according to claim 1, wherein said distribution unit has a circular outer contour in a plan view.

9. The electric device according to claim 1, wherein said distribution unit is formed of an electrically non-conductive material.

10. The electric device according to claim 1, wherein said boiler has two metal end covers, and a central part formed of an electrically non-conductive material extends between said two metal end covers.

11. The electric device according to claim 1, wherein said spacers have a constant spacing therebetween, radiate toward a common center point and create sector-shaped cavities for uniform active distribution of the cooled insulating fluid.

* * * * *